US010393349B2

United States Patent
Sepkhanov

(10) Patent No.: US 10,393,349 B2
(45) Date of Patent: Aug. 27, 2019

(54) OPTICAL ARRANGEMENT, OPTICAL SYSTEM AND A METHOD OF SHAPING AN OPTICAL BEAM

(71) Applicant: SIGNIFY HOLDING B.V., Eindhoven (NL)

(72) Inventor: Ruslan Akhmedovich Sepkhanov, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 66 days.

(21) Appl. No.: 15/512,710

(22) PCT Filed: Sep. 28, 2015

(86) PCT No.: PCT/EP2015/072293
§ 371 (c)(1),
(2) Date: Mar. 20, 2017

(87) PCT Pub. No.: WO2016/050710
PCT Pub. Date: Apr. 7, 2016

(65) Prior Publication Data
US 2017/0292682 A1 Oct. 12, 2017

(30) Foreign Application Priority Data
Sep. 29, 2014 (EP) .................................... 14186793

(51) Int. Cl.
*G02B 27/09* (2006.01)
*F21V 14/06* (2006.01)
(Continued)

(52) U.S. Cl.
CPC .............. *F21V 14/06* (2013.01); *F21V 5/008* (2013.01); *F21V 5/04* (2013.01); *F21V 5/045* (2013.01);
(Continued)

(58) Field of Classification Search
CPC .......... F21V 14/06; F21V 5/008; F21V 5/045; F21V 13/04; F21V 13/12; F21V 5/004
(Continued)

(56) References Cited

U.S. PATENT DOCUMENTS 2,326,970 A * 8/1943 Rantsch ............... G03B 21/208
353/38
4,769,750 A * 9/1988 Matsumoto .......... G02B 3/0043
353/38
(Continued)

FOREIGN PATENT DOCUMENTS

EP 0022506 A1 1/1981
EP 0395156 A1 10/1990
(Continued)

OTHER PUBLICATIONS

O. Dross, et al., "Kohler Integrators Embedded Into Illumination Optics add Functionality", Proceedings of SPIE, vol. 7103, Jan. 1, 2008, pp. 1-12.

*Primary Examiner* — Andrew J Coughlin
(74) *Attorney, Agent, or Firm* — Akarsh P. Belagodu

(57) ABSTRACT

An optical arrangement, comprises first and second optical elements. The first optical plate is for collimating light from a light source to generate collimated light, which is provided to the second optical element. The second optical element acts an optical integrator homogenizing the light. The second optical element further generates a light output beam which has a spread of output angles which is dependent on the position. This means that the output spread of output angles can be controlled by controlling the light reaching the second optical plate and thus by controlling the illuminated area on the second optical plate. This can be achieved by selection of the relative positions of the source and the optical plates.

8 Claims, 4 Drawing Sheets

(a)         (b)

(51) Int. Cl.
  *F21V 5/04* (2006.01)
  *G02B 3/00* (2006.01)
  *G02B 5/02* (2006.01)
  *G02B 19/00* (2006.01)
  *F21V 5/00* (2018.01)
  *G02B 27/30* (2006.01)
  *F21Y 115/10* (2016.01)

(52) U.S. Cl.
  CPC ......... *G02B 3/0043* (2013.01); *G02B 3/0068* (2013.01); *G02B 5/0263* (2013.01); *G02B 19/0014* (2013.01); *G02B 19/0061* (2013.01); *G02B 27/0961* (2013.01); *G02B 27/30* (2013.01); *F21Y 2115/10* (2016.08)

(58) Field of Classification Search
  USPC ........................................................ 362/277
  See application file for complete search history.

(56) References Cited

U.S. PATENT DOCUMENTS

| | | | | |
|---|---|---|---|---|
| 5,208,620 | A | * | 5/1993 | Mitsutake ............... G03B 21/10 348/E5.138 |
| 2003/0169332 | A1 | | 9/2003 | Ebina et al. |
| 2007/0041199 | A1 | * | 2/2007 | Okada ..................... F21V 5/045 362/326 |
| 2008/0304263 | A1 | | 12/2008 | Paulussen |
| 2012/0106151 | A1 | | 5/2012 | Vissenberg et al. |
| 2016/0195243 | A1 | * | 7/2016 | Dross ................... F21V 7/0091 362/297 |

FOREIGN PATENT DOCUMENTS

| | | |
|---|---|---|
| EP | 0563874 A1 | 10/1993 |
| EP | 1873559 A1 | 1/2008 |
| JP | 2010067441 A | 3/2010 |
| WO | WO2012040414 A2 | 3/2012 |

\* cited by examiner

OPTICAL ARRANGEMENT, OPTICAL SYSTEM AND A METHOD OF SHAPING AN OPTICAL BEAM

CROSS-REFERENCE TO PRIOR APPLICATIONS

This application is the U.S. National Phase application under 35 U.S.C. § 371 of International Application No. PCT/EP2015/072293, filed on Sep. 28, 2015, which claims the benefit of European Patent Application No. 14186793.7, filed on Sep. 29, 2014. These applications are hereby incorporated by reference herein.

FIELD OF THE INVENTION

This invention relates to an optical arrangement and particularly but not exclusively to an optical plate for use in lighting units.

BACKGROUND OF THE INVENTION

It is well known that designing the optical components for a spot lighting effect is in general challenging especially for light sources which are not completely uniform in their light output over angle or position. The problem becomes severe when considering medium power light emitting diodes (LEDs) for generating white light or Red-Green-Blue (RGB) LEDs for generating color variable light.

Beam shaping is found in most lighting applications. Beam shaping optical elements for example include reflectors, collimators and lenses. Such elements are used in most luminaires. All of them preform collimating and/or imaging functions.

There are many known light sources available, for example LEDs can be grouped into high power LEDs, medium power LEDs, low power LEDs, clustered LEDs and chip on boards.

The high power LEDs can be dimensionally small, for example with an area of around 1 mm$^2$, and the phosphor of the LED can be well matched with the area of the die. This leads to a relatively uniform colored light distribution with respect to the emission angle and position within the LED emission area. These are however high cost LEDs.

Medium power and low power LEDs are often somewhat larger, for example with an area of 2-6 mm$^2$. This often leads to color distribution effects with respect to position. Furthermore, combining such light sources with optic having some collimation characteristics can result in further color distribution effects with respect to emission angle. Conventionally, these color artifacts are solved by introducing diffusion on top of collimation in the beam shaping elements. This solution is not always possible, and when possible requires stronger initial collimation to achieve the desired beam angle, because diffusion increases the beam angle.

Thus, the color artifacts are a major issue that is well known and often obstructs the application of medium power LEDs.

Clustered LEDs are LEDs that are clustered (for example in a circle). They aim to create a more standardized light source. The advantage is that the type of LEDs can be changed without altering the source significantly (from the optical perspective). A disadvantage of clustering LEDs is that there are dark regions in between the LEDs. Combined with imaging optic the observed output produces typically bright and dark variations with respect to angle. For chip on board (COB) designs, a similar effect is observed of intensity and color artifacts in the collimated light.

Usually, a lighting company offers a range of beam angles in its spot light solutions. Philips, for example, offers at least 24° and 36° beam angles only in its professional spot luminaire range. Two different beam angle luminaires have their own dedicated optic that makes the particular beam.

EP0563874A1 discloses an optical illumination system comprising a first lens array comprising a plurality of first lenses, which are associated with a plurality of second lenses of a second lens array, arranged at focal distance of the first lens array, the second lenses mutually have different sizes and are of different size from the size of the first lenses.

SUMMARY OF THE INVENTION

The invention is defined by the claims.

It is an aspect of the invention to provide an alternative optical arrangement suitable for a lighting unit, which preferably further at least partly obviates one or more of above-described drawbacks. Especially, it is an aspect of the invention to provide an optical plate suitable for a lighting unit with which a universal optic can be used for lighting applications with different beam angle ranges. The beam angle can then be chosen (depending on the market demand) at a latest assembly stage of the luminaire.

Hence, according to a first aspect there is provided an optical arrangement, comprising a first and second optical element being mutually moveable along an axis for generating a variable light output beam:

the first optical element for collimating light from a light source to generate collimated light;

the second optical element for receiving collimated light from the first optical element, an array of convex lenses located on a first face of the second optical element is associated with an array of convex lenses located on a second face of the second optical element opposite the first face, wherein for each lens located on the first face the collimated light source passing through said lens is designed to pass through an associated, directly oppositely positioned lens of the array of lenses located on the second face, and wherein each lens on the second face is designed to focus on the associated lens on the first face, and each lens on the first face is designed to focus on the associated lens on the second face.

It is thus attained that for inputted collimated light within an acceptance angle of the second optical element, the second optical element generates a light output beam with a spread of output angles which is centered with respect to a normal output direction, wherein the spread of output angles is dependent on the position on the second optical element, and is the same for all input angles of the input collimated light that is incident at that position on the second optical element.

The second optical element thus functions as an integrating optical element. For collimated light input to the second optical element at an angle within the input acceptance angle, it generates an output beam which may have a spread of angles corresponding to the input acceptance angle. The output beam is centered along a common normal direction. This normal direction is for example the main optical axis direction of the optical arrangement, i.e. the central output direction of the output beam. The spread of angles of this output beam is dependent on the position at the second optical element.

Note that the dependence of the spread angle on position is not in practice a smooth function. Thus, the term "position" should not be understood to relate to an infinitely small location. In practice, there are preferably discrete optical elements which provide the different spread angles, and the term "position" should be understood as having an accuracy corresponding to the size of such discrete optical elements. Thus, the dependency of the spread of angles on position defines a stepwise function across the overall area of the second optical element. The whole of each discrete optical element can be considered to be at one position. For collimated light provided to the full area of that "position" (from any input angle within the acceptance angle), the output from the second optical element has a particular spread of angles.

The effect of the second optical element is that all possible artifacts of the incoming collimated light stemming from the light source inhomogeneities, including color artifacts, are removed by the second optical element. In particular, every component of collimated light incident at a particular position of the second optical element (within the acceptance angle) results in a light output beam with the same spread of output angles.

By providing a spread of output angles from the second optical element which varies in dependence on position, the overall spread of output angles at the output of the optical arrangement can be controlled by controlling the light incident to the second optical element. For example, the fraction of the second optical element which is illuminated can be controlled. This can be achieved by selecting a suitable relative positioning of the three main components, namely the light source and the first and second optical elements. Thus, the same physical optical structures can be used to implement different overall output beam angles. In addition, the same optical structures can be used for different light sources, and also the same optical structures can be used to eliminate color artifacts of the sources.

By "dependent on position" is meant that at different positions on the output surface of the second optical element, the output light beam has a different spread of output angles.

By the first and second optical element being mutually movable along the axis, for example an optical axis, and when the collimated light is either divergent or convergent, i.e. has an output angle≠0, it is enabled to vary the beam width of the beam issued from the optical arrangement. Said variable beam is also obtainable by the first optical element being moveable with respect to the light source This arrangement for the second optical element functions as an integrator. It has arrays of lenses on opposite sides with each lens on one side having its focus on the principal plane of the corresponding equivalent lens on the opposite side. There is a one-to-one mapping between the lenses. For example, this means the lenses on the first face can focus incident parallel light from a certain angle (from the collimator) to a corresponding lens on the second face. The geometric lens design can be to map all light from the lens on the first surface to the lens on the second surface. The same function can of course be achieved with two separate plates which function as sub-units and which together from the second optical element.

The integrating element due to its integration properties allows for a broad range of light sources to be used, preserving the desired beam shape while not requiring a change in optic. Additionally, it removes possible artifacts of the light source, including color artifacts.

As a result, light passing through the second optical element is output generally normally to the second optical element but with a controlled amount of spread around that normal direction. The output illumination (i.e. the resulting beam) in this generally normal direction is obtained by the combination of the lens array on the first face and the optically aligned lens array on the second face.

The first optical element may generate collimated light with an output angle from the first optical element which depends on the position relative to the light source. This relative position can thus be used to set the range of angles of incidence to the second optical element, and in this way set the fraction of the second optical element which is illuminated.

In one example, a spread of output angles of the light output from the second optical element increases with increasing distance from the center of the second optical element. This means that the overall spread of output angles can be reduced by not providing light to the outer edges of the second optical element.

In another example, the spread of output angles of the second optical element decreases with increasing distance from the center of the second optical element. This means that the overall spread of output angles can be reduced by not providing light to the middle of the second optical element.

The lenses on the first face and second face may each be symmetric about a normal axis passing through the center of each lens. They may for example comprise spherical lenses, cylindrical lenses, or aspheric lenses.

The arrays of lenses on the first and second faces may have an increasing lens width towards the edge of the second optical element. In this way, the spread of output angles is increased towards the edges of the optical element. An opposite arrangement can be used to decrease the spread of output angles towards the edges of the optical element. Thus, in this case, the arrays of lenses on the first and second faces have a decreasing lens diameter towards the edge of the second optical element.

The distance between the paired lenses on the two faces can vary in dependence on the angle of the light passing between them. For a zero order system, this change in distance can be ignored so that all lenses can be designed with the same focal length.

For a first order correction, the incoming light direction, of angle $\alpha$ with respect to the normal, can be taken into account. Due to refraction, this average incoming angle $\alpha$ becomes $\phi$ in the material of the lens plate, where $\sin \alpha = n \sin \phi$.

The focal length f of a first lens of the first lens array is then a function of $1/\cos \phi$, the thickness d which, is the local perpendicular thickness of the plate, should then be adapted to make the second lens of the second lens array be positioned in the focal point of the associated first lens of the first array (and vice versa). As $\cos^2 \phi = 1 - \sin^2 \phi$, then $\cos \phi = \sqrt{(1-\sin^2\phi)}$ or $\cos \phi = \sqrt{(1-(\sin^2\alpha/n^2))}$, which can be rewritten as $\cos \phi = (\sqrt{(n^2-\sin^2\alpha)})/n$ and hence f is a function of $n/\sqrt{(n^2-\sin^2\alpha)}$.

The lens focal lengths of the lenses can then be designed to correspond to $f=n^*d/\sqrt{(n^2-\sin^2\alpha)}$, which varies in dependence on the refractive index of the material of the plate, on the curvature of the lens and on the average angle of incoming light on the integrating optical plate.

The lenses on the first and second faces may comprise annular lenses or else annular rings of individual lenses. The light source is then located at the optical axis or in the vicinity of the optical axis.

The first, collimating, optical element may comprise a Fresnel lens structure or other lens structure. Alternatively, the first, collimating, optical element may comprise a collimator, including a total internally reflective (TIR) collimator or by a reflector.

The spread of output angles at the output of the optical arrangement is preferably dependent on the spacing between the light source and the first optical element and the spacing between the first and second optical elements. In this way, different spacings may be selected for different uses of the same optical elements, to achieve different output beam angles.

The invention also provides a lighting system comprising:
an optical arrangement of the invention; and
the light source.

The optical arrangement may for example be annular about an axis, and the light source is positioned on the axis or close to the axis.

The invention also provides a method of shaping an optical beam from a light source, comprising:
generating light using the light source; and
passing the light through an optical arrangement, which comprises a first optical element for collimating light from a light source to generate collimated light and a second optical element for receiving light from the first optical element, wherein for input collimated light within an acceptance angle of the second optical element, the second optical element generates a light output beam with a spread of output angles which is centered with respect to a normal output direction, wherein the spread of output angles is dependent on the position on the second optical element, and is the same for all input angles of the input collimated light that is incident at that position on the second optical element,
wherein the method comprises:
selecting the spacing between the light source and the first optical element and the spacing between the first and second optical elements in order to achieve a desired spread of output angles at the output of the optical arrangement.

BRIEF DESCRIPTION OF THE DRAWINGS

Examples of the invention will now be described in detail with reference to the accompanying schematic drawings, in which.

DETAILED DESCRIPTION OF THE EMBODIMENTS

The invention provides an optical arrangement, comprising first and second optical elements. The first optical element is for collimating light from a light source to generate collimated light. The second optical element generates a light output beam which has an output angle which is dependent on the position and also acts as an integrator that homogenizes the light, thus removing color artifacts. This means that the spread of output angles can be controlled by controlling the light reaching the second optical element and thus by controlling the illuminated area on the second optical element. This can be achieved by selection of the relative positions of the source and the optical elements. For example, the position of the first optical element may be adjusted relative to the second optical element and light source, or both optical elements may be adjusted in position with relative to each other and relative to the light source.

Figure 1:
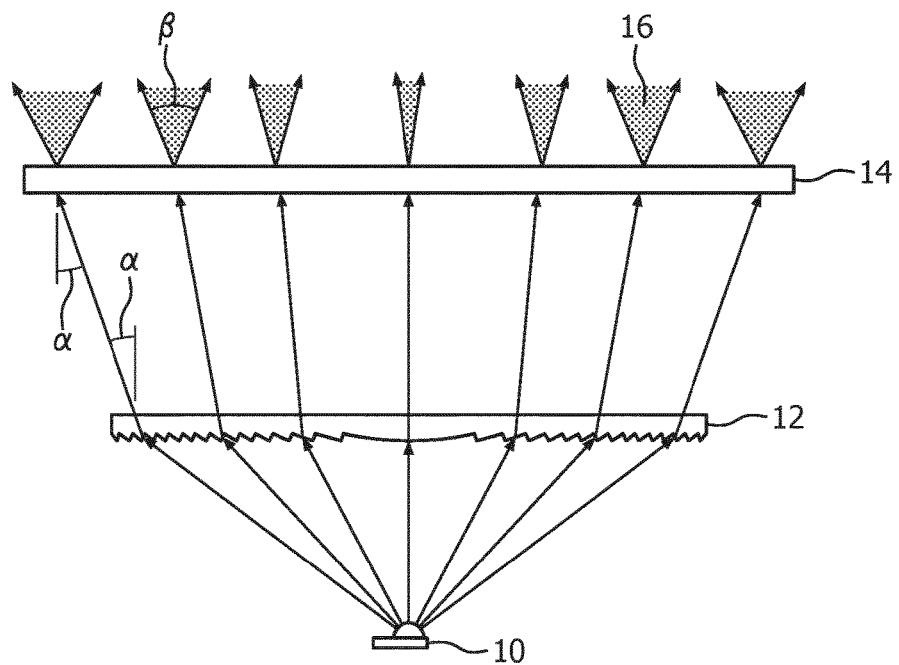
FIG. 1 shows schematically an example of a lighting system using the optical arrangement of the invention.

FIG. 1 shows an optical system in accordance with one example of the invention.

The system comprises a light source 10, for example an LED, a collimating optical element 12, which in this example is in the form of a first, collimating, optical plate 12, and a second optical element which in this example is in the form of a second, integrating, optical plate 14.

The collimating optical plate 12 is for example a Fresnel lens, and it pre-collimates the light and delivers it to the integrating optical plate. This means the light exiting from any particular point on the surface of the collimating optical plate 12 has a limited range of angles forming a beamlet, for example an angular spread of less than 10 degrees. The angular spread of the beamlets is defined by the distance to the source and the source size. However, the light exiting the collimating optical plate has an output angle with respect to the normal (shown as $\alpha$ in FIG. 1) which varies in dependence on the position.

In particular, further from the center, the angle increases so that there is overall divergence of the optical beam between the two optical plates. This means the illuminated area of the second optical plate depends on the spacing between the two plates.

The output angle $\alpha$ is preferably within the acceptance angle of the second optical plate, for example $\alpha<\beta/2$ where $\beta$ is the acceptance angle and also the spread of output angles at the output of the second optical plate 14 (which varies with position).

The integrating optical plate 14 forms a light beam 16 from each beamlet received from the collimating optical plate 12. The light beam is centered about the normal direction. Furthermore, light originating from different regions of the light source 10 (because it will not be a perfect point source) is preferably substantially uniformly mixed by the integrating optical plate 14.

The resulting beam output from the optical system is a superposition of the beams 16 formed by the integrating optical plate 14. Each of the beams 16 are uniformly mixed.

The integrating optical plate 14 eliminates color artifacts by the uniform mixing.

The integrating optical plate 14 is designed such that the spread of output angles (shown as $\beta$ in FIG. 1) depend on the position on the integrating optical plate 14. In particular, as shown in FIG. 1, the beam angle $\beta$ changes as a function of position. In the example of FIG. 1, the beam angle is the smallest in the center and becomes broader closer to the periphery of the integrating optical plate 14.

This means that the spread of output angles can be controlled by controlling the illuminated area of the integrating optical plate 14.

In particular, there are at least two ways to change the beam angle of the resulting beam.

A first approach is to adjust the distance between the collimating and integrating optical plates 12,14. If the distance between the collimating and integrating optical plates decreases, only the inner part of the integrating optical plate 14 is used, which has the narrower beam angle. The parts of the integrating optical plate that make a broad beam do not receive any light. Therefore the resulting beam becomes narrower. The opposite happens when the distance increases.

A second approach is to adjust the distance between the collimating optical plates 12, 14 and the light source. If the distance between the collimating optical plate and the light source decreases, the range of angles of incidence to the collimating optical plate increases, so that a larger angle α from the integrating optical plate results. This in turn gives a larger angle of divergence between the two optical plates, so that parts of the integrating optical plate that make a broad beam are used and the resulting beam becomes broader. The opposite happens when the distance increases.

Thus the angular beam width can be controlled by controlling the relative positions of the light source and the two optical plates.

Figure 2:
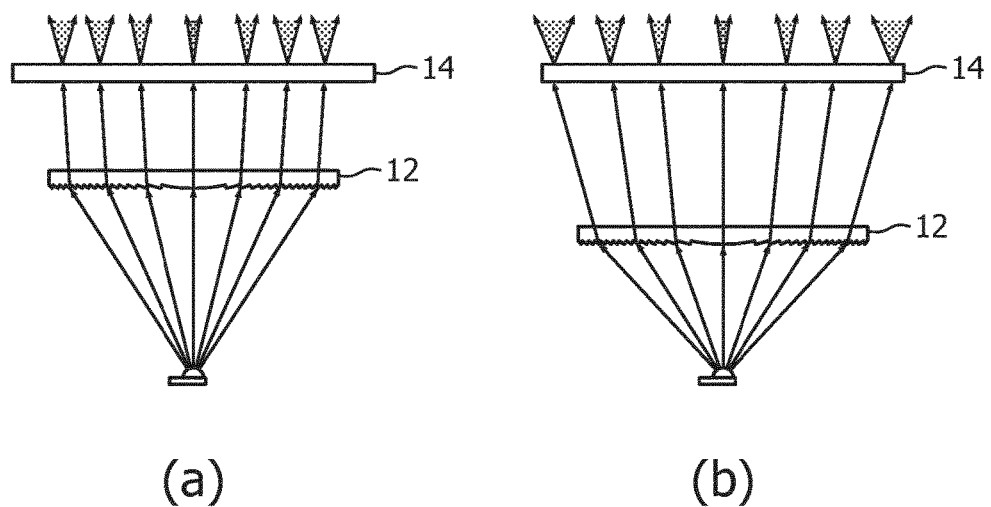
FIGS. 2a and 2b show different possible configurations for the components of the optical arrangement of FIG. 1.

This second approach is shown in FIG. 2, where FIG. 2(*a*) shows a narrow beam, and FIG. 2(*b*) shows a broad beam.

FIGS. 1 and 2 show an example in which a spread of output angles of the light output from the second optical element increases with increasing distance from the center of the second optical element.

Figure 3:
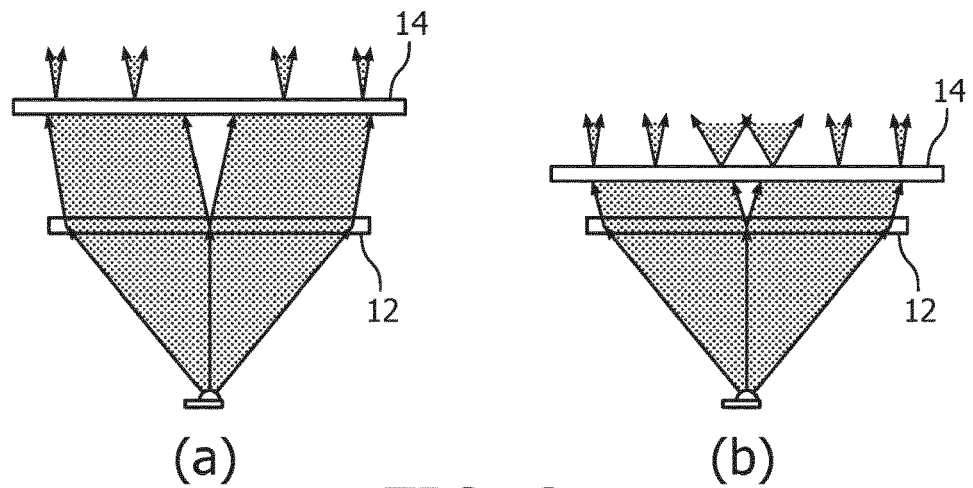
FIGS. 3a and 3b show different possible configurations for the components of an alternative design of optical arrangement.

An alternative is shown in FIG. 3 in which the spread of output angles of the light output from the second optical element decreases with increasing distance from the center of the second optical element. The distance between the first and second optical plates 12,14 can then determine whether or not the central part of the second optical plate is illuminated. FIG. 3(*a*) shows a narrow beam configuration. There is a large spacing between the two optical plates. The first optical plate 12 does not pass light in a normal direction so that a gap is present in the center. There is therefore a central region of the second optical plate which is not illuminated, and this is the part which would give a wide beam output.

FIG. 3(*b*) shows a broad beam output, with a smaller spacing between the optical plates so that the full area of the second optical plate is illuminated.

The integrating optical plate may comprise focusing optical structures, preferably convex lenses, that are positioned in the focal planes of each other. This means their focal points lie on the principal planes of each other. Such pairs of lenses are also known as Koehler integrating elements. Multiple pairs of such lenses are incorporated in the integrating optical plate.

Figure 4:
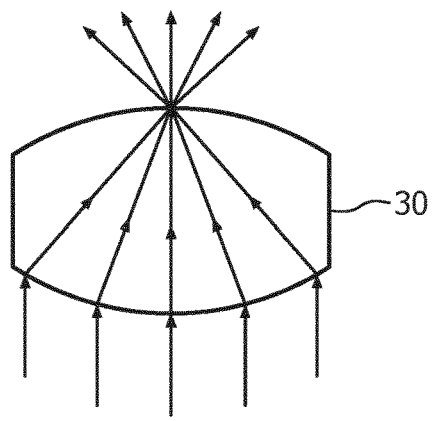
FIG. 4 shows one lens pair used in the integrating optical element of the optical arrangement of FIGS. 1 to 3.

FIG. 4 illustrates a single pair 30 of lenses arranged in this way. The main property of the pair of lenses is that any light that falls onto it within its acceptance angle becomes a beam of light with opening angle equal to the acceptance angle. The beam is angle uniform, which means there is an equal amount of light passing in all directions within the acceptance angle and no light beyond the acceptance angle.

The integrating optical plate creates output beams from incident collimated light with the same spread angle (equal to the acceptance angle) from every parallel beam falling onto the plate within the acceptance angle at the same position. FIG. 4 shows this with a parallel beam falling normally on the integrating optical plate. The same happens to any other parallel incoming beam falling onto the integrator, although the rays will be focused off-center on the second lens for off-normal incidence. The output beamlet will however have exactly the same spread angle. Because all the beam spreads created from all the incoming sets of parallel rays are the same, the output light is homogenized.

FIG. 4 shows parallel light entering an integrating pair and becoming a beam of light with a certain opening angle. The opening angle is equal to the acceptance angle.

The acceptance angle and thus the opening angle is determined by the properties of the lens pair and is given by:

$$\theta_a = \tan^{-1}(D/2t),$$

where D is the lens diameter and t is the thickness of the element.

The thickness is the distance between the focusing elements and is the focal length given by:

$$t = f = n/(n-1)R,$$

where R if the lens radius of curvature and n is the refractive index of the lens material.

Thus, by varying the diameter of such pairs of lenses, an integrating element is achieved with the desired properties. That is, an integrating element can be created with increasing acceptance angles away from the center of the element.

Figure 5A:
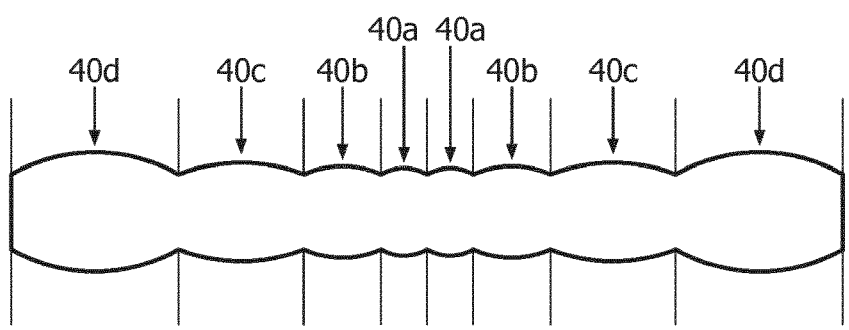
FIG. 5A-B shows one example of a cross-section of the paired lenses of the integrating optical element of the optical arrangement of FIGS. 1 to 3 and the variable distance between the paired lenses on the two faces in dependence on the angle of the light.

A schematic view of an integrating element with pairs of four different diameters and thus four different acceptance angles is shown in FIG. 5A. The vertical lines indicate the boundaries between the elements with different diameters.

The lenses of the integrating optical plate preferably tessellate to fill the area of the second plate surface. The tessellation can be random (e.g. a Voronoi tessellation), a semi-regular tessellation that includes lens diameters of different shapes and sizes, or regular square tessellation, or regular triangular tessellation. The lenses can have a slight overlap due to the tessellation.

The lens pairs are shown as 40*a*, 40*b*, 40*c* and 40*d*. As shown, the structure is symmetrical about a center line, with the lens diameters increasing as the distance from the center increases.

As is clear from the equations above, an alternative is to vary the plate thickness with position, or to vary both the lens diameter and the plate thickness.

In reality there will be many more pairs of lenses, for example microlenses. This allows for almost continuous variation in the acceptance angle and thus output angle.

The integrating optical plate thus has curved lenses or lens elements on the input side and curved lenses or lens elements on the output side, arranged in such a manner that each of the curved lens elements on the input side has an associated or optically aligned curved lens element on the output side.

The lenses may have substantially constant radius of curvature across their width, i.e. they may be regular spherical lenses centered on their axis of symmetry.

Each lens on the input side focuses the light received from the collimating optical plate onto a corresponding lens on output side, because the focal length of the lens on the input side is equal to the distance to the corresponding lens on the output side.

The distance between the paired lenses on the two faces can vary in dependence on the angle of the light passing between them. For a zero order system, this change in distance can be ignored so that all lenses can be designed with the same focal length.

For a first order correction, the incoming light direction, of angle α with respect to the normal, of light rays 41 on a lens 40*a* . . . *d* of the second optical element 50, can be taken into account. Due to refraction, this average incoming angle α becomes φ in the material of the lens plate, where sin α=n sin φ.

The focal length is then f=d/cos φ, where d is the perpendicular thickness of the plate. As $\cos^2\phi = 1-\sin^2\phi$, then $\cos\phi = \sqrt{(1-\sin^2\phi)}$ or $\cos\phi = \sqrt{(1-(\sin^2\alpha/n^2))}$, which can be rewritten as $\cos\phi = (\sqrt{(n^2-\sin^2\alpha)})/n$ and hence $f = n*d/\sqrt{(n^2-\sin^2\alpha)}$.

Figure 5B:
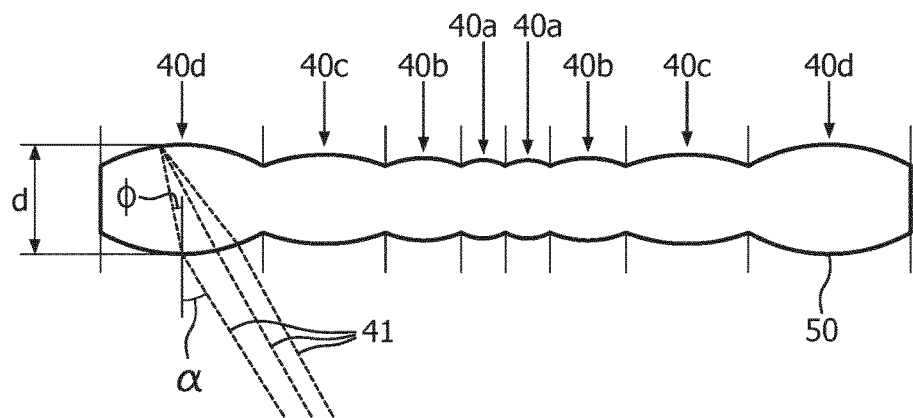

The lens focal lengths of the lenses can then be designed to correspond to $n*d/\sqrt{(n^2-\sin^2\alpha)}$, which varies in dependence on the refractive index of the material of the plate, and on the average angle of incoming light on the integrating optical plate. This variable distance and variable focal length f are shown in FIG. 5B.

Figure 6:
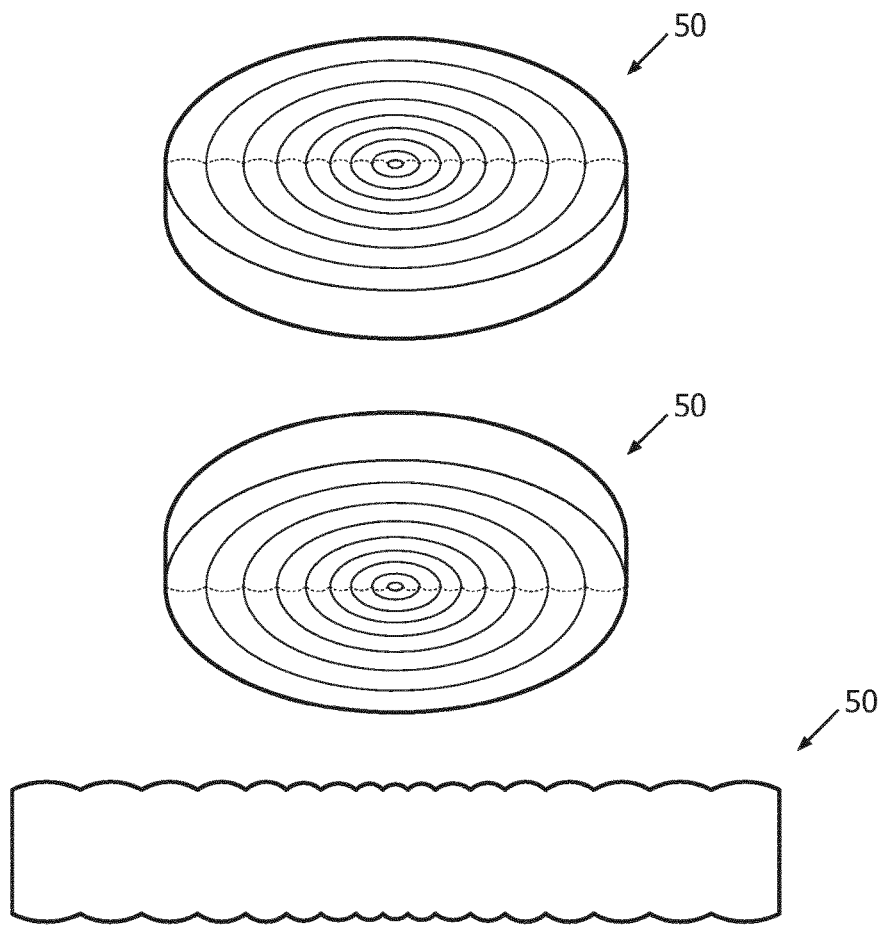
FIG. 6 shows schematically views of an example of optical arrangement to show the annular symmetry.

The optical plates can be rotationally symmetric, and the lenses can then be annular (as for example can be seen in FIG. 6). Around the annulus, the lenses have a constant cross sectional shape (in a plane which includes the radial width vector and the normal vector).

The light source may comprise multiple lighting units, for example of different color. The integrating optical plate also functions to mix the different colors uniformly to prevent color separation. It also prevents the boundaries between lighting elements being visibly projected.

FIG. 6 shows an example of the integrating optical plate. It shows a perspective top view, a perspective bottom view and a cross section. The lenses are formed as annular 1D lens elements 50 forming a concentric circle distribution. Although FIG. 6 shows an annular or concentric circle distribution it will be understood that in some embodiments the lens distribution can be any suitable shape or shapes. For example in some embodiments there may be a central circular distribution, a hexagonal (or other regular or irregular polygon) edge distribution and a hybrid or mixing between the two as the lens position varies between the center and the edge.

Figure 7:
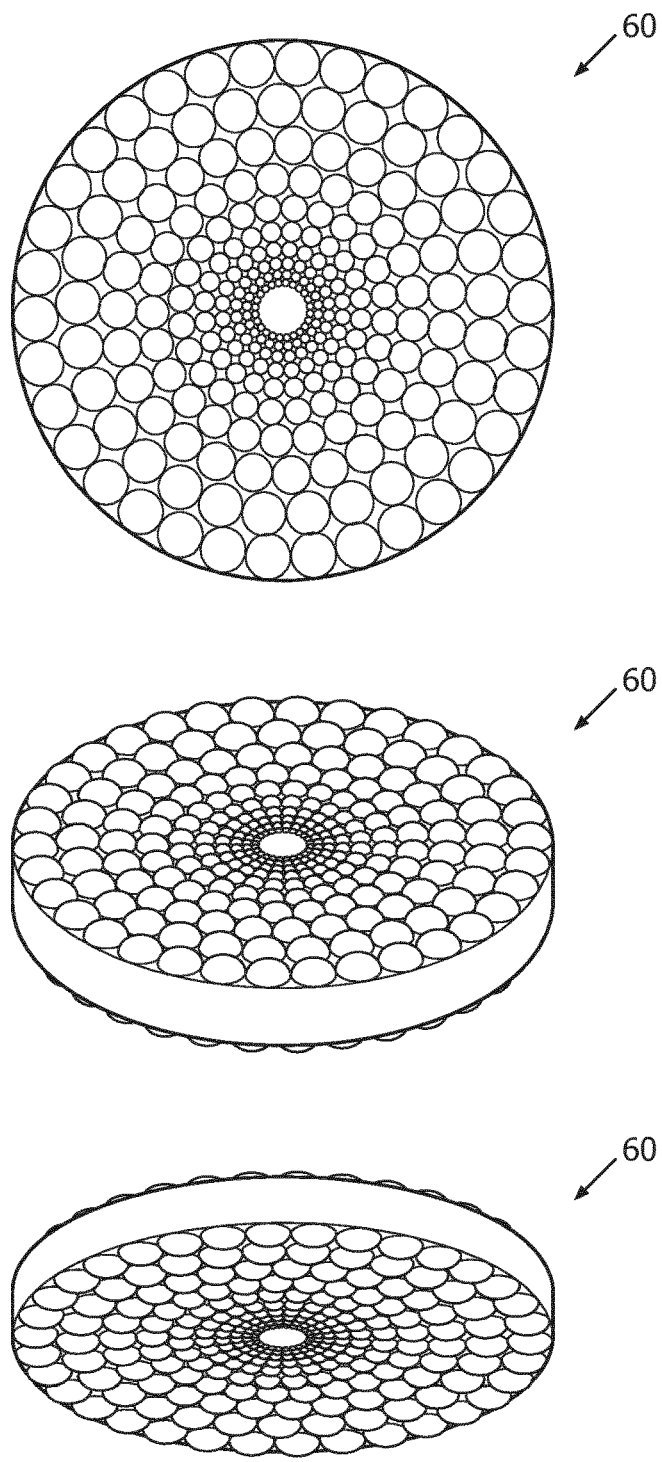
FIG. 7 shows schematically views of a further example of optical element.

FIG. 7 shows a plan view, a perspective top view and a perspective bottom view of another example of integrating optical plate. It has a 2D array of lens elements. The optical plate is shown comprising a number of lens elements 60 arranged in an annular or circular distribution around the optical axis of the optical plate. Instead of continuous annular lens elements, the lens elements are discrete individual circular lens elements, but arranged in annular rings. The lens elements are distributed with a rotational discrete symmetry per ring. Although the optical plate is shown comprising a circular distribution of individual lens elements it will be understood that in some embodiments the distribution can be any suitable shape or shapes.

Again, the individual lens distribution can be a first shape (such as a circular shape) at the center of the optical plate and a second shape (such as a hexagonal symmetrical shape) at the edge of the shape with intermediate shapes between the center and edge of the optical plate. In some embodiments for example the shape or distribution of individual lenses can be defined based on the light source distribution or configuration.

In some embodiments the light source may comprise an arrangement of a plurality of light source units. This arrangement may be a 2D arrangement, and may be regular, such as a cubic arrangement or a hexagonal arrangement. However, the arrangement may also be irregular. There may be at least 4 light source units, such as at least 16, 25, 49, or even at least 100 light source units. Note however that substantially larger numbers are also possible.

In some embodiments, the light source unit comprises one or more solid state light source (such as a LED or laser diode). In a further specific embodiment, the plurality of light source units may comprise two or more subsets, which may be independently controllable. Alternatively or additionally, the plurality of light source units may comprise two or more subsets which are configured to generate light having different colors.

The examples described herein are illustrated with respect to two optical plates, but it will be understood that in some embodiments there may be three or more optical plates. For example, the integration can be performed by two separate lens plates instead of a single integrating plate. The optical plates may be arranged parallel to each other and parallel to the arrangement of the plurality of light sources.

The total thickness of each optical plate may be in the range of 0.2-20 mm, and may in some embodiments be 0.2-5 mm, including the optical elements. The optical plates may in some embodiments have cross-sectional areas in the range of 4 mm²-50 m², although even larger may be possible.

In some embodiments the optical plates comprise a polymeric material, for example one or more materials selected from the group consisting of PE (polyethylene), PP (polypropylene), PEN (polyethylene napthalate), PC (poly-carbonate), polymethylacrylate (PMA), polymethylmethacrylate (PMMA) (Plexiglas or Perspex), cellulose acetate butyrate (CAB), silicone, polyvinylchloride (PVC), polyethylene terephthalate (PET), (PETG) (glycol modified polyethylene terephthalate), PDMS (polydimethylsiloxane), and COC (cyclo olefin copolymer). However, other (co)polymers may also be possible. Also, the optical plates may be made of glass.

The lighting device may be part of or may be applied in e.g. office lighting systems, household application systems, shop lighting systems, home lighting systems, accent lighting systems, spot lighting systems, theatre lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An optical arrangement, consisting of a first and a second optical element being mutually moveable along an axis for generating a variable light output beam:
   the first optical element for collimating light from a light source to generate collimated light;
   the second optical element for receiving collimated light from the first optical element, wherein an array of convex lenses located on a first face of the second optical element is associated with an array of convex lenses located on a second face of the second optical element opposite the first face, wherein for each lens located on the first face the collimated light passing through said lens is designed to pass through an associated, directly oppositely positioned lens of the array of lenses located on the second face, and wherein each lens on the second face is designed to focus on the associated lens on the first face, and each lens on the first face is designed to focus on the associated lens on the second face, and, wherein the arrays of lenses on the first and second faces have an increasing or decreasing lens diameter towards the edge of the second optical element, such that a spread of output angles of the light output from the second optical element increases or decreases with increasing distance from the center of the second optical element, and the spread of output angles at the output of the optical arrangement is dependent on the spacing between the light source and the first optical element or the spacing between the first and second optical elements.

2. An optical arrangement as claimed in claim 1, wherein the lenses on the first face and second face are spherical lenses.

3. An optical arrangement as claimed in claim 1, wherein the lens focal lengths f of each respective lens corresponds to $f=n*d/\sqrt{(n^2-\sin^2 a)}$, wherein n is the refractive index of the lens material, d is the thickness of said lens and a is the average incoming angle of incident light on said lens.

4. An optical arrangement as claimed in claim 1, wherein the lenses on the first and second faces comprise annular lenses or annular rings of individual lenses.

5. An optical arrangement as claimed in claim 1, wherein the first optical element comprises a Fresnel lens structure.

6. A lighting system comprising:
    an optical arrangement as claimed in claim 1; and
    the light source.

7. A lighting system as claimed in claim 1, wherein the optical arrangement is symmetric about the axis, and the light source is positioned on or adjacent the axis.

8. A method of shaping an optical beam from a light source, comprising:
    generating light using the light source; and
    passing the light through an optical arrangement as claimed in claim 1, wherein for input collimated light within an acceptance angle of the second optical element, the second optical element generates a light output beam with a spread of output angles which is centered with respect to a normal output direction, wherein a spread of output angles is dependent on the position on the second optical element, and is the same for all input angles of the input collimated light that is incident at that position on the second optical element,
    wherein the method comprises:
    selecting the spacing between the light source and the first optical element and the spacing between the first and second optical elements by mutually moving the first and second optical element in order to achieve a desired spread of output angles at the output of the optical arrangement.

* * * * *